US008482523B2

(12) United States Patent
Didier et al.

(10) Patent No.: US 8,482,523 B2
(45) **Date of Patent: *Jul. 9, 2013**

(54) MAGNETIC CONTROL DEVICE

(75) Inventors: Stanley N. Didier, Plymouth, MN (US); Dale M. Gulick, Grand Blanc, MI (US)

(73) Assignee: Sauer-Danfoss Inc., Ames, IA (US)

( * ) Notice: Subject to any disclaimer, the term of this patent is extended or adjusted under 35 U.S.C. 154(b) by 2364 days.

This patent is subject to a terminal disclaimer.

(21) Appl. No.: 11/161,792

(22) Filed: Aug. 17, 2005

(65) Prior Publication Data

US 2007/0040802 A1 Feb. 22, 2007

(51) Int. Cl.
*G06F 3/033* (2006.01)

(52) U.S. Cl.
USPC .......................................................... 345/161

(58) Field of Classification Search
USPC ......... 345/156, 161, 167; 74/471 XY; 463/38
See application file for complete search history.

(56) References Cited

U.S. PATENT DOCUMENTS

| | | | | |
|---|---|---|---|---|
| 3,331,972 | A | 7/1967 | Moller | |
| 4,500,867 | A * | 2/1985 | Ishitobi et al. | 338/128 |
| 4,733,214 | A | 3/1988 | Andresen | |
| 4,825,157 | A | 4/1989 | Mikan | |
| 5,421,694 | A | 6/1995 | Baker et al. | |
| 5,491,462 | A * | 2/1996 | Cecchi et al. | 338/128 |
| 5,559,432 | A * | 9/1996 | Logue | 324/207.17 |
| 5,675,359 | A * | 10/1997 | Anderson | 345/161 |
| 5,831,554 | A * | 11/1998 | Hedayat et al. | 341/20 |
| 5,831,596 | A * | 11/1998 | Marshall et al. | 345/161 |
| 5,850,142 | A * | 12/1998 | Rountos et al. | 324/207.2 |
| 5,969,520 | A | 10/1999 | Schottler | |
| 6,043,806 | A | 3/2000 | Atwell et al. | |
| 6,501,458 | B2 * | 12/2002 | Baker et al. | 345/161 |
| 6,515,650 | B2 * | 2/2003 | Arita et al. | 345/156 |
| 2002/0149565 | A1 | 10/2002 | Sako | |
| 2005/0023917 | A1 * | 2/2005 | Kesting et al. | 310/156.43 |

FOREIGN PATENT DOCUMENTS

| | | | |
|---|---|---|---|
| JP | Sho58-150234 | A | 10/1983 |
| JP | Hei04-109285 | A | 9/1992 |
| JP | 2002-174532 | A | 6/2002 |

* cited by examiner

*Primary Examiner* — Chanh Nguyen
*Assistant Examiner* — Robert Stone
(74) *Attorney, Agent, or Firm* — Zarley Law Firm, P.L.C.

(57) ABSTRACT

A control device having an elongated shaft, a C-shaped magnet, and an anti-rotation pin. The magnet and the anti-rotation pin are encapsulated in a spherical member. The C-shaped magnet has opposing ends defining an open slot along the C-shaped main body. The anti-rotation pin extends through the slot and connects to the shaft.

5 Claims, 3 Drawing Sheets

MAGNETIC CONTROL DEVICE

DESCRIPTION OF THE INVENTION

The present invention relates generally to control devices, and more specifically to a magnetic joystick device.

Manual control devices, commonly referred to as joysticks, are used in various apparatus such heavy construction. These devices control parameters such as position, velocity and acceleration. Typically, these control devices have an extended shaft with a handle at one end and a shaped component at the opposing end that interacts with one or more sensors. Movement of the handle is translated by the sensors into electrical signals that are communicated to the apparatus actuating a desired response.

The sensors detect movement of a magnet associated with the shaped component. Desirable is that the magnet is positioned close to the face of the sensor. Typically, magnets are mechanically fastened to the shaft which limits allowable space for design. Further, screws, clamps, adhesives, or moldings may fail due to temperature, humidity, or vibration.

Accordingly, there is a need for a manual control device that is more robust than conventional joysticks, does not suffer from performance degradation, and also contains a minimum number of components to provide high reliability in harsh environments.

Therefore, a primary objective of the present invention is to provide a manual control device that is die cast around a magnet.

A further objective of the present invention is to provide a joystick device that includes an anti-rotation pin located at least partially within an open slot along a C-shaped magnet.

These and other objectives will be apparent to those skilled in the art based on the following description.

SUMMARY OF THE INVENTION

A control device includes a sintered C-shaped magnet and an anti-rotation pin. The sintered C-shaped magnet and the anti-rotation pin are encapsulated in a spherical member. The C-shaped magnet has opposing ends defining an open slot along the C-shaped main body. The anti-rotation pin is located at least partially within the open slot.

DETAILED DESCRIPTION OF THE PREFERRED EMBODIMENT

Figure 1:
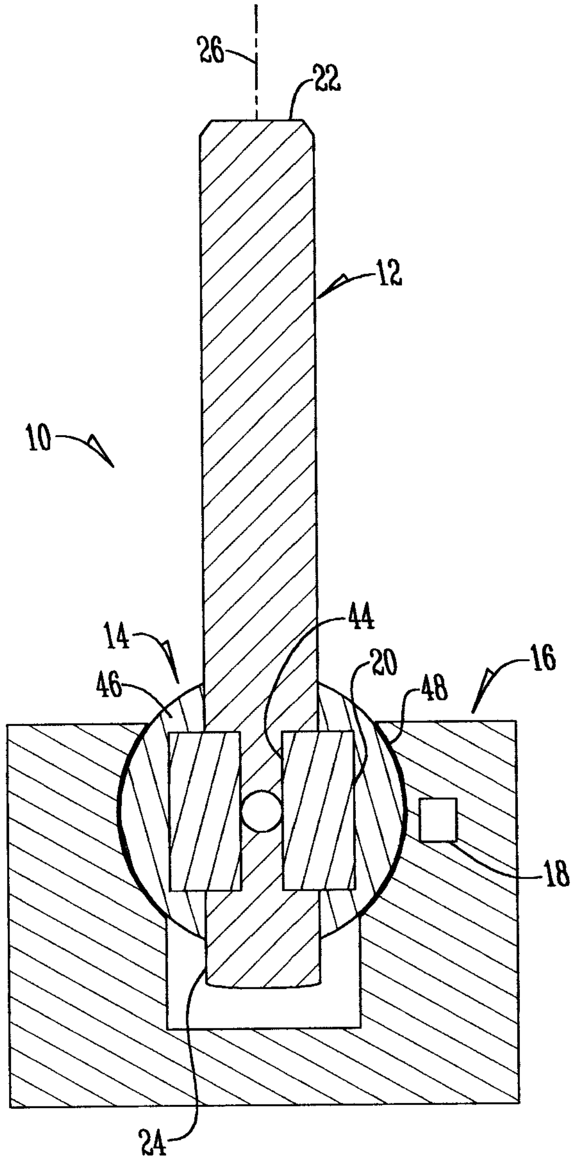
FIG. 1 is a side elevation cross-sectional view of a control device.
Figure 2:
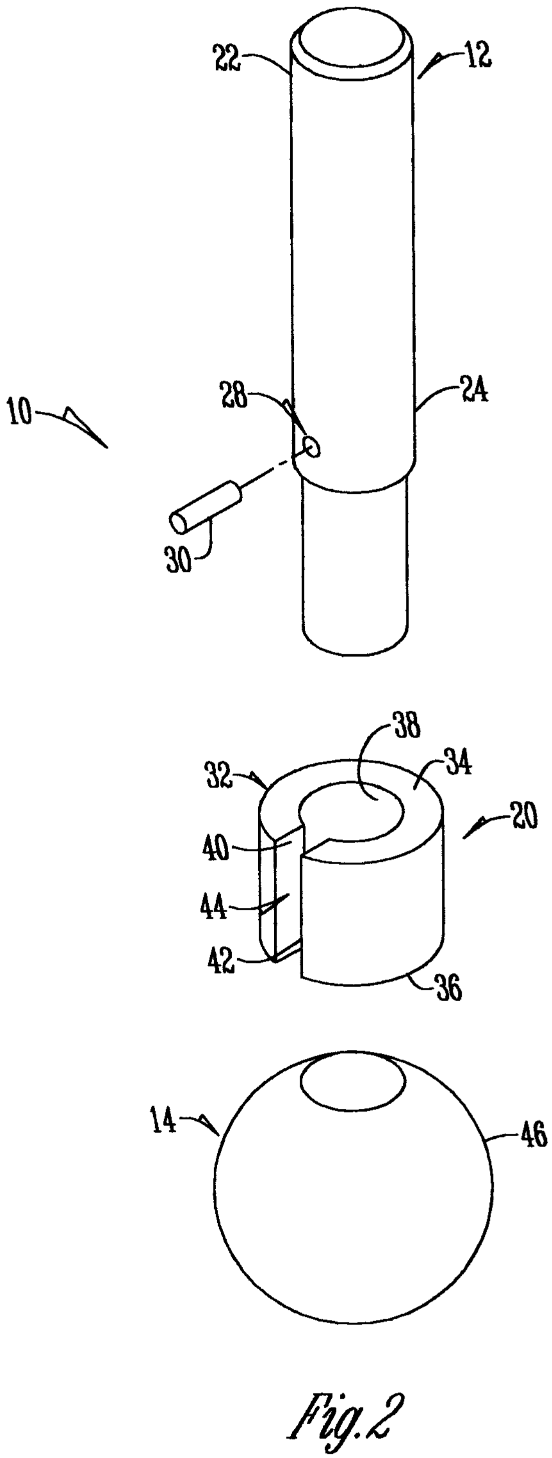
FIG. 2 is an exploded perspective view of a control device.

With respect to FIGS. 1 and 2, a control device 10 provides for a non-contact based detection of a tilt angle based on the manual input by an operator. In general, the control device 10 includes a control shaft 12 attached to a spherical member 14 at one end of the control shaft 12. A supporting member 16 supports the spherical member 14 of the control device 10 in such a manner that the spherical member 14 can pivot freely around the center of the sphere. The angle and direction that the control shaft 12 is tilted are detected by one or more magnetic sensors 18 fixed to the supporting member 16 and interacting via contact-free electric signals with a magnet 20 located within the spherical member 14.

The control shaft 12 extends from a grip end 22 to a fastening end 24 along a center axis 26 of the control device 10. The grip end 22 is used by an operator to provide manual input to the control device 10. The fastening end 24 is secured to the spherical member 14, and is contained therein. Alternatively, the shaft 12 is connected to the exterior of member 14. The fastening end 24 includes a through bore 28 adapted to receive a portion of an anti-rotation pin 30 therein.

The spherical member 14 includes the magnet 20 formed as a sintered magnet preferably made of Neodymium-iron-boron (NdFeB) material. Alternatively, the magnet 20 is made of Samarium Cobalt (Sm Co, $Sm_1$ Co5, $Sm_2$ Col7), bonded or a sintered ferrite (ceramic). The magnet 20 is formed to have a C-shaped main body 32 with opposing top and bottom ends 34 and 36. The top and bottom ends 34 and 36 preferably form a pair of flat planar surfaces oriented generally parallel to one another to form N and S poles of the magnet 20. The spherical member 14 is magnetized with the poles (N and S) of the magnet 20 straddling an equator of the spherical member 14, and perpendicular to the shaft axis 26.

The C-shaped main body 32 has a central opening 38 formed therein along the center axis 26 of the control device 10. The central opening 38 is adapted to receive the shaft 12. The body 32 has an interrupted sidewall 39 that terminates in opposing planar surfaces 40 and 42 is spaced apart from one another to form an open slot 44 between surfaces 40 and 42. The open slot 44 is adapted to receive the anti-rotation pin 30 therethrough. The anti-rotation pin 30 is installed through the open slot 44 and into the bore 28 in the fastening end 24 of the shaft 12.

A spherical ball 46 is formed over the fastening end 24 of the shaft 12, the anti-rotation pin 30 as well as the sintered magnet 20. The sintered magnet 20 is completely encapsulated by the spherical ball. A portion of the fastening end 24 of the shaft 12 as well as a portion of the anti-rotation pin 30 may extend beyond the outer surface of the spherical ball 46. The spherical ball 46 is preferably made of zinc and allows the control device 10 to have rotational motion in all directions. The spherical ball 46 also serves as a spherical bearing for the mated supporting member 16.

Supporting member 16 forms a spherical shaped bushing 48 supporting the spherical member 14. The spherical shaped bushing 48 slidably receives the spherical member 14 and permits the spherical member 14 to pivot freely around the center of the sphere. The magnetic sensors 18 are mounted on or within the spherical shaped bushing 48. The magnetic sensors 18 are preferably Hall effect sensors or any other suitable magnetic sensor type. From one to four magnetic sensors 18 are provided. Where more than one sensor 18 is provided, the magnetic sensors 18 are positioned 90 degrees from one another, and are positioned normal to the forward and reverse axis of motion as well as the left and right axis of motion.

To assemble the control device 10, the fastening end 24 of the control shaft 12 is inserted into the central opening 38 of the magnet 20. The anti-rotation pin 30 is then inserted into bore 28 of the shaft 12 such that pin 30 extends through and beyond slot 44 of the main body 32 of the magnet 20. A die (not shown) is fitted around the assembled pieces and zinc or another material is added to the die to form the spherical ball 46 around the assembled pieces. In this manner, the spherical ball holds the shaft 12, magnet 20, and pin 30 together while interacting with sensors 18 in support member 16.

Alternatively, the die is made such that the shaft 12 and anti-rotation pin 30 are formed along with ball 46 when zinc is added to the die.

In operation, as an operator provides manual input to the shaft 12, the shaft 12 is moved from its neutral position (i.e. straight up). During the movement of the shaft 12 the magnetic sensors 18 sense the offset of the north-south poles of the magnet 20 and output a proportional electrical current. A single hall sensor 18 is used to sense motion that is normal to the axis of motion such as the forward and reverse axis of motion or the left and right axis of motion. If redundancy is required two magnetic sensors 18 are used to sense motion that is normal to the axis of motion such as the forward and reverse axis of motion or the left and right axis of motion. In multi-axis applications, the output from two hall effect sensors 18 are combined to determine the motions that are not normal to the axis of motion such as the forward and reverse axis of motion or the left and right axis of motion. If redundancy is required four magnetic sensors are used in multi-axis applications to determine the motions that are not normal to the axis of motion such as the forward and reverse axis of motion or the left and right axis of motion.

Figure 3:
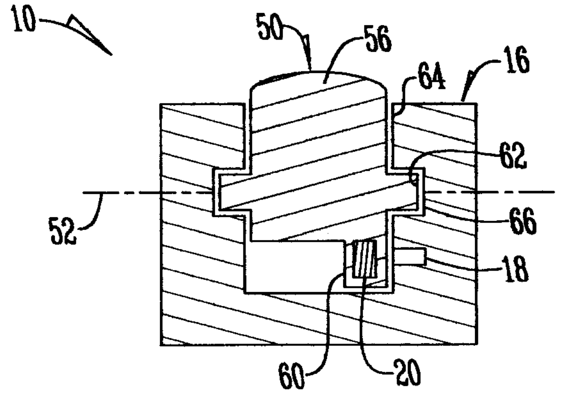
FIG. 3 is a side elevation cross-sectional view of a control device.
Figure 4:
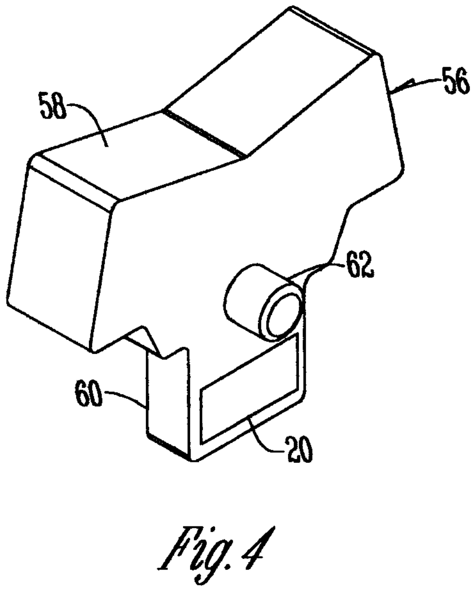
FIG. 4 is perspective view of a control button.

With respect to FIGS. 3 and 4, an alternative control device 10 provides for a non-contact based detection of a tilt angle based on the manual input by an operator. In general, the control device 10 includes a control button 50 supported by a supporting member 16 in such a manner that the control button 50 can pivot freely around axis 52. The angle and direction that the control button 50 is tilted and detected by one or more magnetic sensors 18 fixed to the supporting member 16 and interacting via contact-free electric signals with a magnet 20 located within the control button 50.

The control button 50 has a T-shaped main body 56 having a button surface 58 along an upper end thereof and an extension arm 60 extending generally perpendicular to the button surface 58. The magnet 20 is preferably located in the extension arm 60 of the main body 56. The sintered magnet 20 is completely encapsulated by the main body 56. The magnet 20 is preferably a sintered magnet formed from Neodymium-iron-boron (NdFeB) material. A pivot pin 62 extends from one or more sides of the T-shaped main body 56. The pivot pin 62 defines the axis of rotation 52 for the control button 50.

The supporting member 16 has a central opening 64 therein receiving the control button 50. Pivot slots 66 formed in sidewalls of the support member 16 receive the pivot pin 62. The pivot slots 66 secure the control button 50 within the central opening 64 and permits the control button 50 to rotate about the pivot pin 62 relative to the supporting member 16. One or more magnetic sensors 18 are mounted in the supporting member 16 adjacent the magnet 20 of the control button 50 to sense movement thereof.

To assemble, the magnet 20 and pivot pin 62 are fitted to a die (not shown) and zinc, or another material, fills the die to form the T-shaped body 56 and connect the magnet 20 and pivot pin 62 to the main body 56. Alternatively, the die is designed to form a pivot pin 62 and main body 56 around the magnet 20 as a single piece.

In operation, as an operator provides manual force to the button surface 58, the T-shaped main body 56 is moved from its neutral position (i.e. straight up). During the movement of the T-shaped main body 56 the magnetic sensors 18 sense the offset of the north-south poles of the magnet 20 and output a proportional electrical current.

A single sensor 18 is used to sense motion that is normal to the axis of motion such as the forward and reverse axis of motion or the left and right axis of motion. If redundancy is required two magnetic sensors 18 are used to sense motion that is normal to the axis of motion such as the forward and reverse axis of motion or the left and right axis of motion.

It will be appreciated by those skilled in the art that other various modifications could be made to the device without departing from the spirit in scope of this invention. All such modifications and changes fall within the scope of the claims and are intended to be covered thereby.

What is claimed is:

1. A control device comprising:

an elongated shaft;

a C-shaped magnet having an elongated slot, the magnet formed to receive the shaft in a center opening;

an anti-rotation pin connected to the shaft and extending through the slot of the magnet; and a spherical member formed to encapsulate the magnet.

2. The control device of claim 1 wherein spherical member is made of zinc.

3. The control device of claim 1 wherein the magnet is made of Neodymium-iron-boron.

4. The control device of claim 1 wherein the shaft, anti-rotation pin, and spherical member are formed of one piece.

5. The control device of claim 4 wherein the one piece is made of zinc.

* * * * *